(12) United States Patent
Gwak et al.

(10) Patent No.: US 6,440,329 B1
(45) Date of Patent: Aug. 27, 2002

(54) SRTIO$_3$:PR, A$_1$ BASED PHOSPHOR HAVING EFFICIENT EMISSION AT LOW VOLTAGE

(75) Inventors: Ji-hye Gwak, Seoul; Shang-hyeun Park, Chungcheongnam-do, both of (KR)

(73) Assignee: Samsung SDI Co., Ltd. (KR)

( * ) Notice: Subject to any disclaimer, the term of this patent is extended or adjusted under 35 U.S.C. 154(b) by 0 days.

(21) Appl. No.: 09/664,093

(22) Filed: Sep. 19, 2000

(30) Foreign Application Priority Data

Apr. 26, 2000 (KR) .............................. 00-22163

(51) Int. Cl.$^7$ .............................................. C09K 11/67

(52) U.S. Cl. ......................... 252/301.4 F; 252/301.6 F

(58) Field of Search ...................... 252/301.4 F, 301.6 F

(56) References Cited

U.S. PATENT DOCUMENTS 5,619,098 A  *  4/1997 Toki et al. .................. 313/496
5,650,094 A  *  7/1997 Royce et al. ......... 252/301.4 F

FOREIGN PATENT DOCUMENTS

KR        2001-0011735        2/2001

* cited by examiner

*Primary Examiner*—C. Melissa Koslow
(74) *Attorney, Agent, or Firm*—Burns, Doane, Swecker & Mathis, L.L.P.

(57) ABSTRACT

A SiTiO$_3$:Pr, Al based phosphor having efficient emission at a low voltage, which is an oxide phosphor emerging as a very likely substitute for sulfide based phosphors. The SrTiO$_3$:Pr, Al based phosphor has the composition of (Me$^I$Me$^{II}$Me$^{III}$)TiO$_3 \cdot$ A$_2$O$_3$ obtained by adding Me$^{II}$ to a phosphor having the composition of (Me$^I$Me$^{III}$)TiO$_3 \cdot$ A$_2$O$_3$, where Me$^I$ is a metal selected from the group consisting of magnesium (Mg), calcium (Ca), strontium (Sr) and barium (Ba), Me$^{II}$ is a metal of zinc (Zn) or cadmium (Cd), Me$^{III}$ is a metal selected from the group consisting of praseodymium (Pr), europium (Eu), terbium (Tb), erbium (Er), cerium (Ce) and thulium (Tm), and A is a metal selected from the group consisting of aluminum (Al), gallium (Ga), indium (In) and thallium (Tl). The SrTiO$_3$:Pr, Al based phosphor can enhance luminance without changing CIE chromaticity (x=0.67, y=0.33), and thus it is applicable to display devices including cathodeluminescence (CL) devices operating with low voltages.

8 Claims, 6 Drawing Sheets

SRTIO₃:PR, A₁ BASED PHOSPHOR HAVING EFFICIENT EMISSION AT LOW VOLTAGE

BACKGROUND OF THE INVENTION

1. Field of the Invention

The present invention relates to a phosphor having efficient emission at a low voltage, and more particularly, to a $SrTiO_3$:Pr, Al based phosphor applicable for driving displays at a low voltage, which is a kind of oxide phosphor emerging as a very likely substitute for sulfide based phosphors.

2. Description of the Related Art

Field emission displays (FEDs) need a phosphor with high luminescent efficiency to be driven with low voltages of 1 kV or less. An existing sulfide based phosphor applied to FEDs has problems in terms of chemical stability and charge build-up during operation. To avoid these problems, research has been conducted into oxide based phosphors.

Oxide based phosphors have a luminance which is 30 to 40% of that of sulfide based phosphors. The sulfide based phosphor used in FEDs has effective emission at a high voltage (5 to 10 kV). However, in FEDs operated with a driving voltage as low as 1 kV or less, the luminance is lowered due to the problem of charge-build up. For this reason, there is a need for a novel phosphor with high luminescent efficiency at a low voltage, especially for a high-efficiency oxide based phosphor capable of replacing the existing sulfide phosphor.

One kind of oxide based phosphor that has been developed is $SrTiO_3$:Pr phosphor. However, the $SiTiO_3$:Pr phosphor shows low luminance at a low voltage. To improve this problem, U.S. Pat. No. 5,619,098 taught $SrTiO_3$:Pr, Al based phosphors with increased luminance. However, further development of phosphors for FEDs having effective emission and stability at a driving voltage as low as 1 kV or less, is needed.

SUMMARY OF THE INVENTION

To solve the above problems, it is an objective of the present invention to provide a $SrTiO_3$:Pr, Al based phosphor having high luminance, applicable to display devices such as field emission displays (FEDs) operating with a voltage as low as 1 kV or less.

The objective of the present invention is achieved by a $SrTiO_3$:Pr, Al based phosphor having effective emission at a low voltage, having the composition of $(Me^{I}Me^{II}Me^{III})TiO_3 \cdot A_2O_3$ obtained by adding $Me^{II}$ to a phosphor having the composition of $(Me^{I}Me^{III})TiO_3 \cdot A_2O_3$, where $Me^{I}$ is a metal selected from the group consisting of magnesium (Mg), calcium (Ca), strontium (Sr) and barium (Ba); $Me^{II}$ is a metal of zinc (Zn) or cadmium (Cd), $Me^{III}$ is a metal selected from the group consisting of praseodymium (Pr), europium (Eu), terbium (Tb), erbium (Er), cerium (Ce) and thulium (Tm), and A is a metal selected from the group consisting of aluminum (Al), gallium (Ga), indium (In) and thallium (Tl).

Preferably, in the above composition of $(Me^{I}Me^{II}Me^{III})TiO_3 \cdot A_2O_3$, $Me^{II}$ is Zn and A. Preferably, $Me^{II}$ is added in an amount of 0.01 to 15 mole %, and at least one flux selected from the group consisting of $SrCl_2$, $ZnCl_2$, $SrI_2$, $ZnI_2$ and $CdI_2$ is used. If the flux is used, the amount of flux may be in the range of 0.5 to 60 mole %. Preferably, in the composition of $(Me^{I}Me^{II}Me^{III})TiO_3 \cdot A_2O_3$, $Me^{III}$ is added in an amount of 0.05 to 5 mole %, and A is added in an amount of 0.5 to 80 mole %.

BRIEF DESCRIPTION OF THE DRAWINGS

The above objective and advantages of the present invention will become more apparent by describing in detail preferred embodiments thereof with reference to the attached drawings in which.

DETAILED DESCRIPTION OF THE INVENTION

A $SrTiO_3$:Pr, Al based phosphor having effective emission at a low voltage according to the present invention, having the composition of $(Me^{I}Me^{II}Me^{III})TiO_3 \cdot A_2O_3$, is obtained by adding $Me^{II}$ to a conventional phosphor having the composition of $(Me^{I}Me^{III})TiO_3 \cdot A_2O_3$, where $Me^{I}$ is a metal selected from the group consisting of magnesium (Mg), calcium (Ca), strontium (Sr) and barium (Ba); $Me^{II}$ is a metal of zinc (Zn) or cadmium (Cd), $Me^{III}$ (0.05 to 5 mole %) is a metal selected from the group consisting of praseodymium (Pr), europium (Eu), terbium (Tb), erbium (Er), cerium (Ce) and thulium (Tm), and A (0.5 to 80 mole %) is a metal selected from the group consisting of aluminum (Al), gallium (Ga), indium (In) and thallium (Tl).

Preferably, in the formula $(Me^{I}Me^{II}Me^{III})TiO_3 \cdot A_2O_3$, $Me^{II}$ is Zn and A is Al.

Preferably, $Me^{II}$ is added in an amount of 0.01 to 15 mole %, and at least one compound selected from the group consisting of $SrCl_2$, $ZnCl_2$, $CdCl_2$, $SrI_2$, $ZnI_2$ and $CdI_2$ is used as a flux. The amount of flux may be in the range of 0.5 to 60 mole %.

The $SrTiO_3$: Pr, Al based phosphor having effective emission at a low voltage according to the present invention can be formed by adding additives to a variety of solid materials so as to change the structure of phosphor for better characteristics, and by use of flux capable of enhancing crystalline characteristics. In other words, a structural approach has been applied to prepare the $SrTiO_3$:Pr, Al based phosphor, for example, by incorporating an Zn series additive such as $Zn(OH)_2$ and $Cd(OH)_2$. In addition, a halide series flux, such as $ZnCl_2$ or $SrCl_2$ is used in the preparation of the $SrTiO_3$:Pr, Al based phosphor, which facilitates a firing reaction during the preparation, so that the crystalline characteristics are improved.

The present invention will be described in greater detail by means of the following examples. The following examples are for illustrative purposes and not intended to limit the scope of the invention.

EXAMPLE 1

Figure 1A:
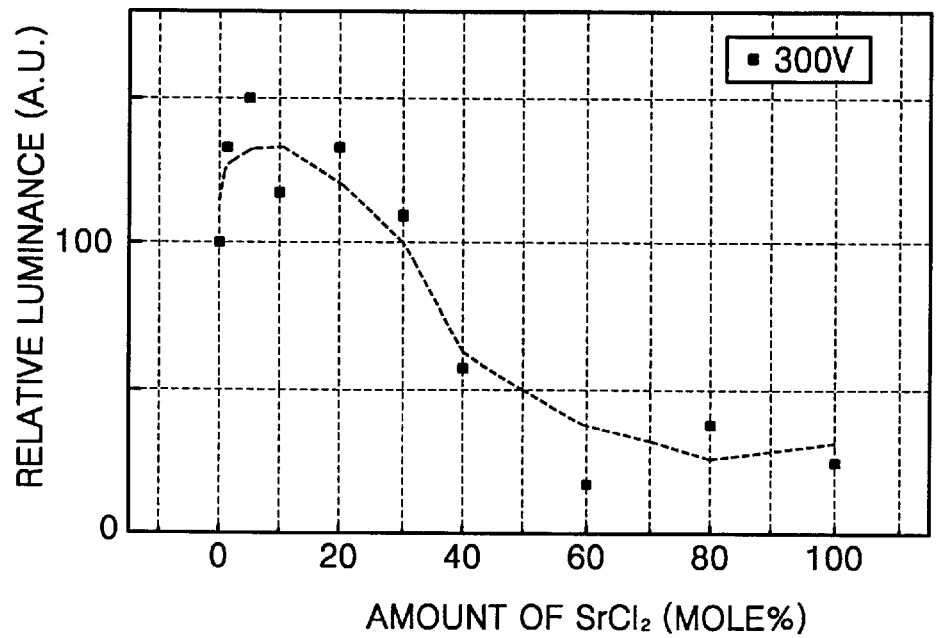
FIGS. 1A through 1C are graphs showing the relative luminance of the phosphor prepared in Example 1 at various voltage levels with respect to the amount of $SrCl_2$.
Figure 1B:
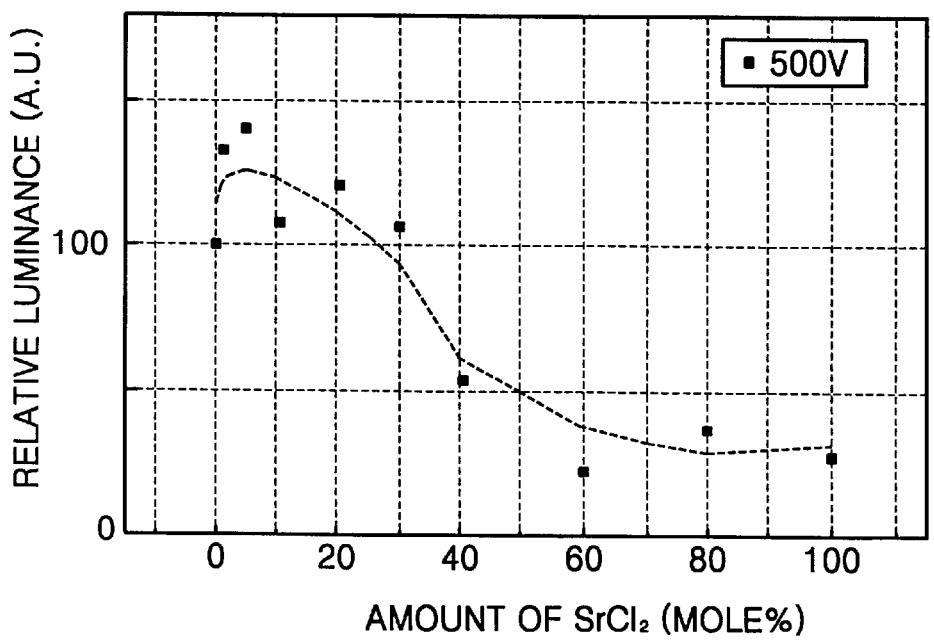
Figure 1C:
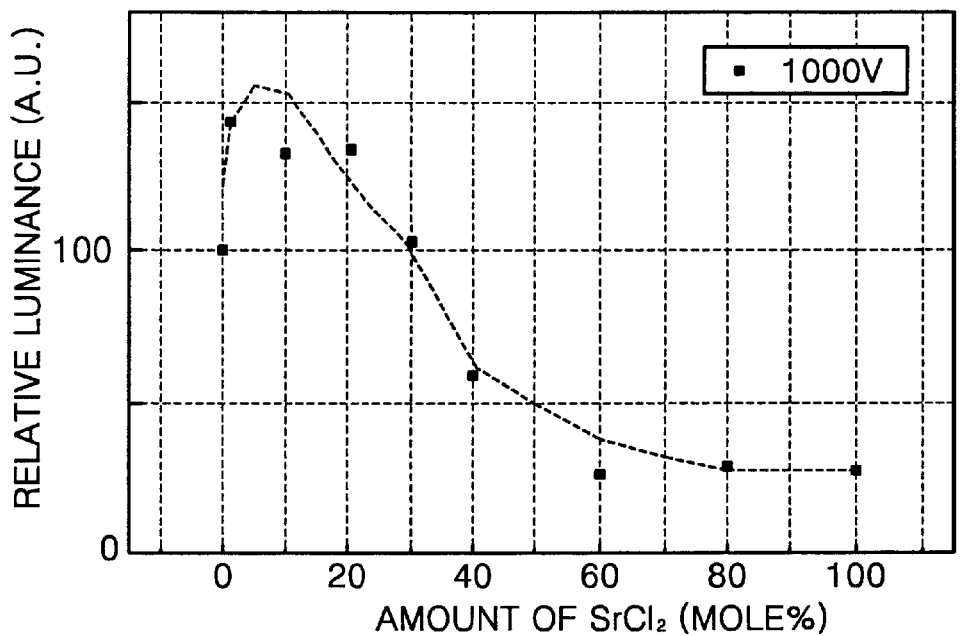

A phosphor was prepared based on a $SrTiO_3$ matrix, using 0.012 mole % of $Pr^{3+}$, 60 mole % of $Ga_2O_3$ and 1 to 30 mole % of $SrCl_2$. Here, $SrCl_2$ was added as a flux. FIGS. 1A through 1C show the relative luminance of the prepared phosphor at different voltages with respect to the amount of SrCl$_2$. The levels of voltages applied to the anode were 300 V, 500 V and 1000 V, respectively, in FIGS. 1A, 1B and 1C. As shown in FIGS. 1A through 1C, the luminance at a low voltage of 300 V is as high as at 500 V and 1000 V.

EXAMPLE 2

Figure 2A:
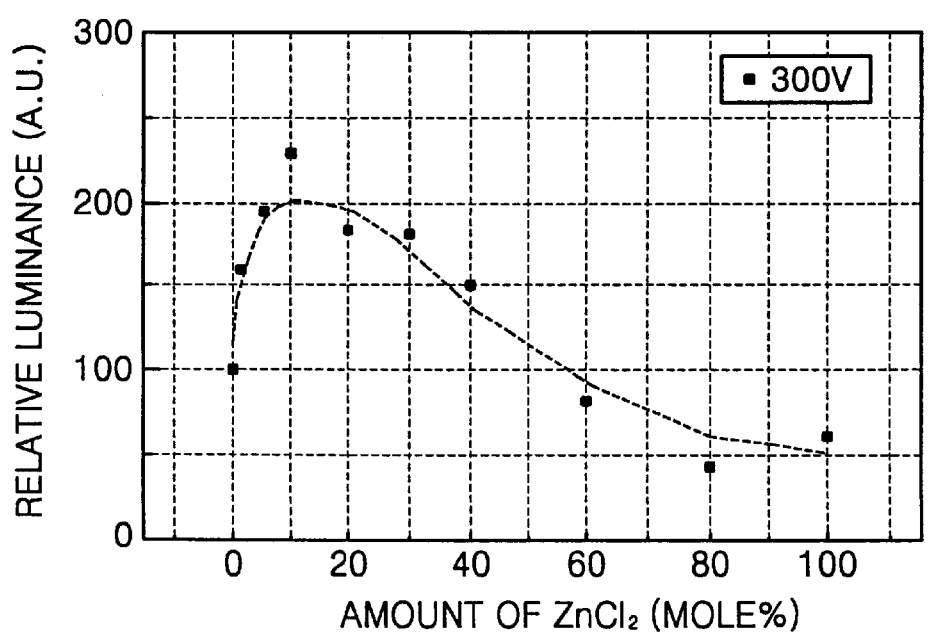
FIGS. 2A through 2C are graphs showing the relative luminance of the phosphor prepared in Example 2 at various voltage levels with respect to the amount of $ZnCl_2$.
Figure 2B:
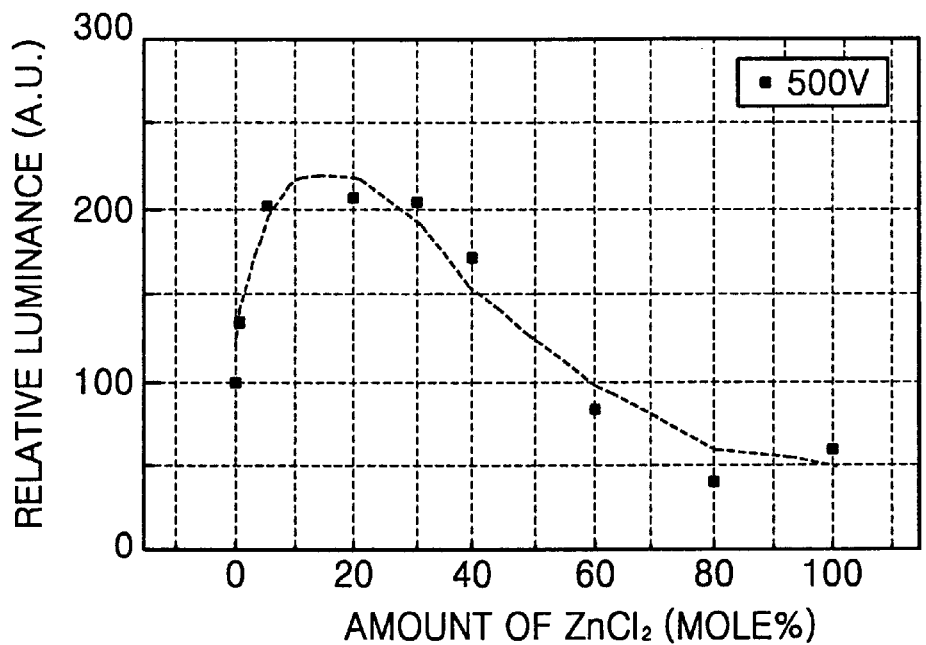
Figure 2C:
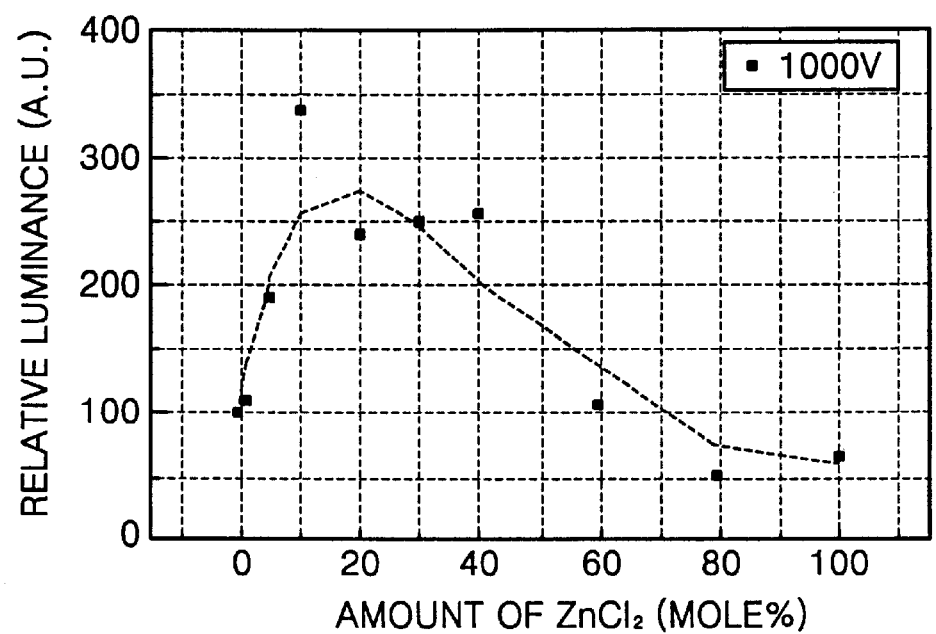

A phosphor was prepared based on a SrTiO$_3$ matrix, using 0.125 mole % of Pr$^{3+}$, 60 mole % of Ga$_2$O$_3$ and 1 to 60 mole % of ZnCl$_2$. Here, ZnCl$_2$ was added as a flux. FIGS. 2A through 2C show the relative luminance of the prepared phosphor at different voltages with respect to the amount of ZnCl$_2$. The levels of voltages applied to the anode were 300 V, 500 V and 1000 V, respectively, in FIGS. 2A, 2B and 2C. As shown in FIGS. 2A through 2C, the luminance at a low voltage of 300 V is as high as at 500 V and 1000 V.

EXAMPLE 3

Figure 3A:
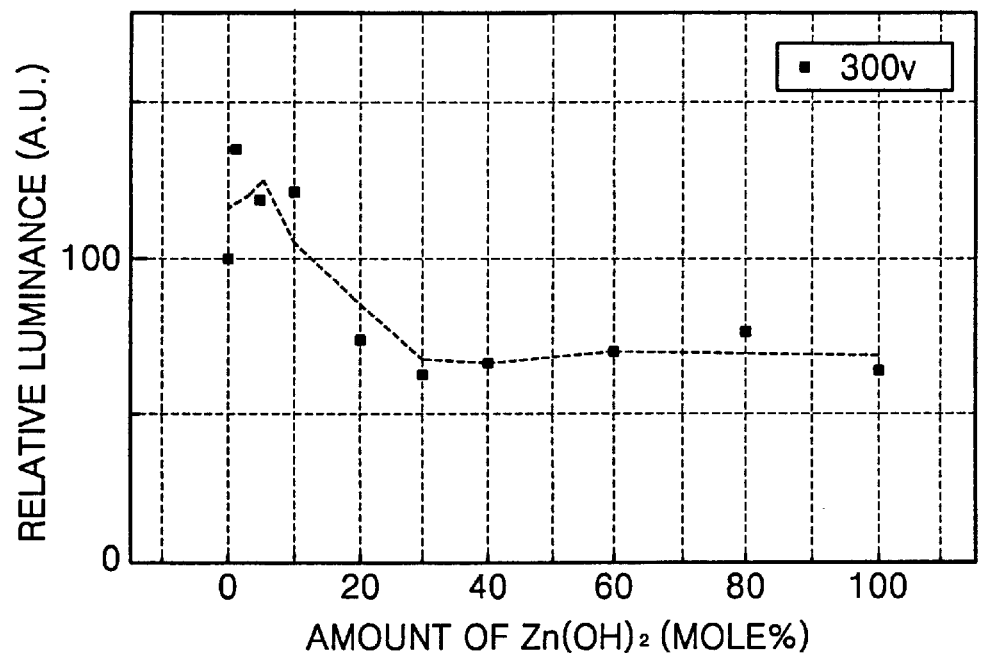
FIGS. 3A through 3C are graphs showing the relative luminance of the phosphor prepared in Example 3 at various voltage levels with respect to the amount of $Zn(OH)_2$.
Figure 3B:
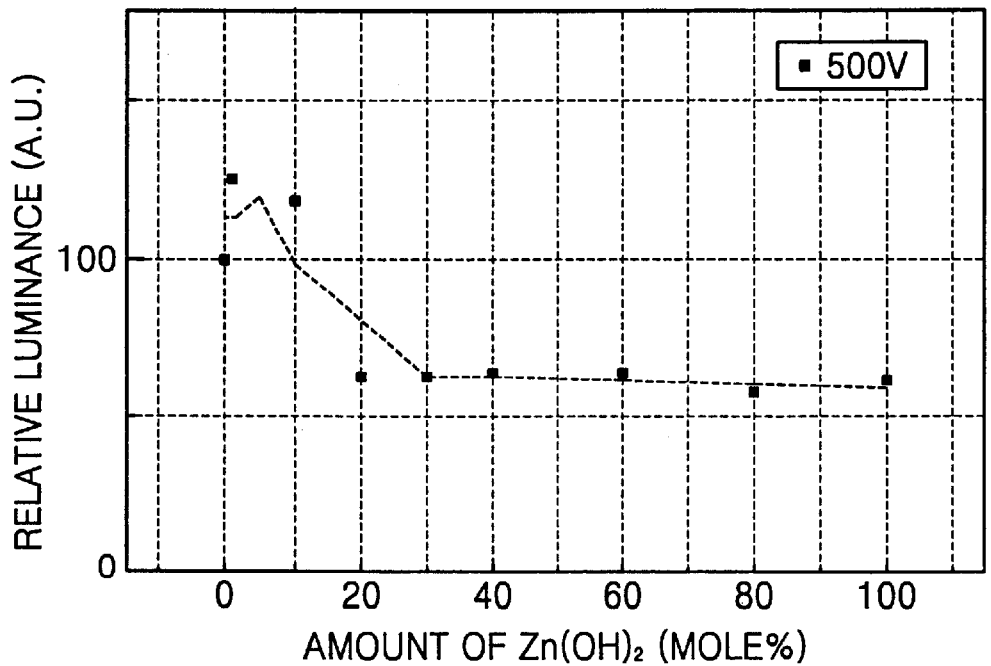
Figure 3C:
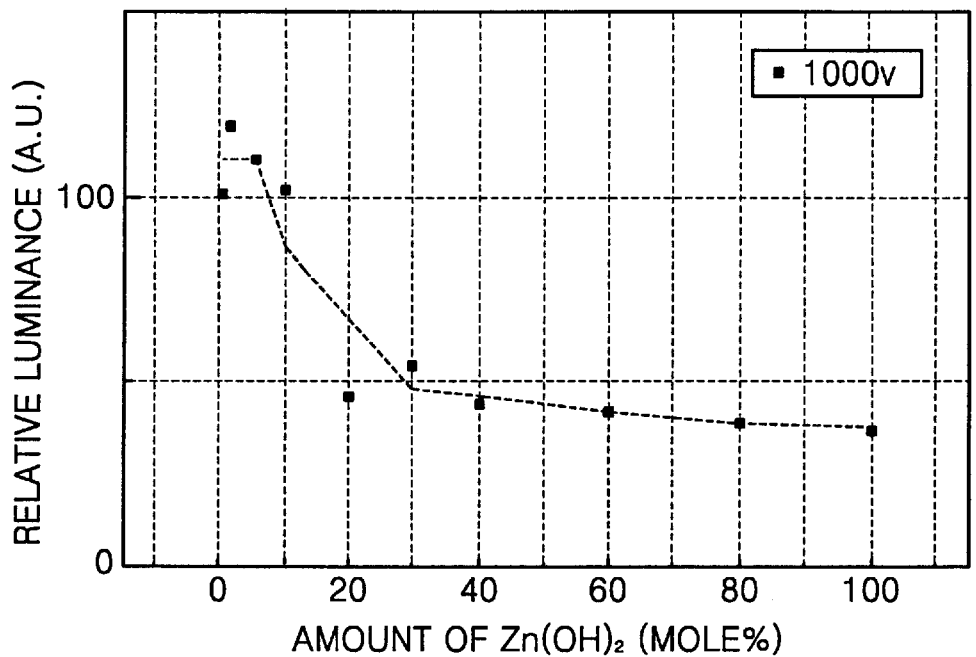

A phosphor was prepared based on a SrTiO$_3$ matrix, using 0.125 mole % of Pr$^{3+}$, 20 mole % of Al(OH)$_3$ and 1 to 10 mole % of Zn(OH)$_2$. Here, Zn(OH)$_2$ was added as a Zn series additive. FIGS. 3A through 3C show the relative luminance of the prepared phosphor at different voltages with respect to the amount of Zn(OH)$_2$. The levels of voltages applied to the anode were 300 V, 500 V and 1000 V, respectively, in FIGS. 3A, 3B and 3C. As shown in FIGS. 3A through 3C, the luminance at a low voltage of 300 V is as high as at 500 V and 1000 V.

EXAMPLE 4

Figure 4:
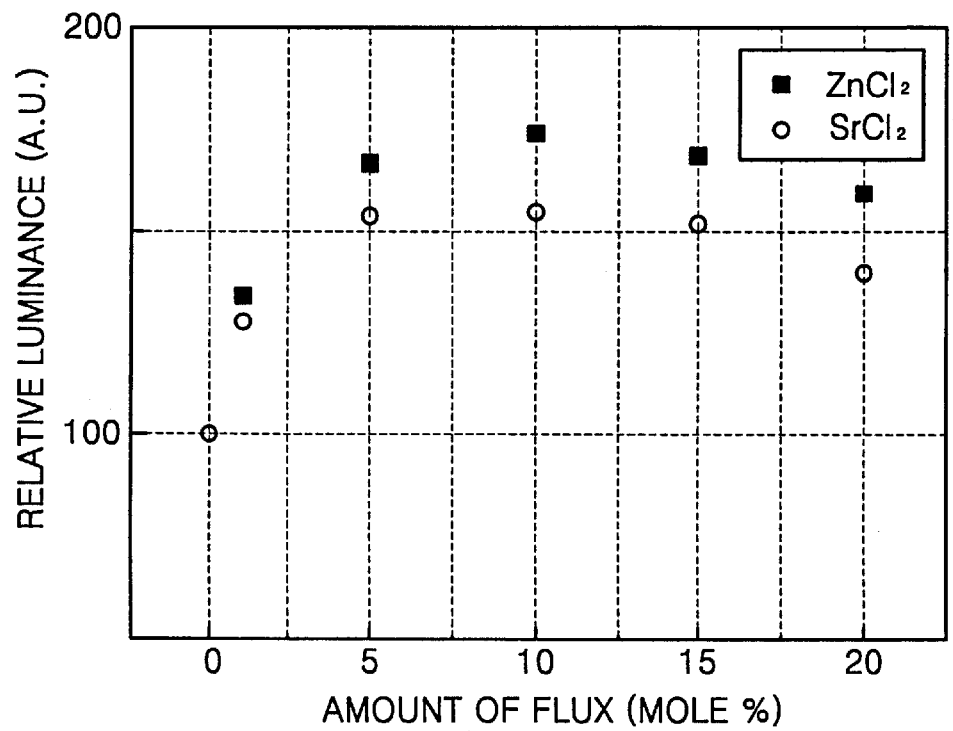
FIG. 4 shows the relative luminance of the prepared phosphors with respect to the amount of flux.

For comparison between different fluxes, phosphors were prepared based on a SrTiO$_3$ matrix, using 0.3 mole % of Pr$^{3+}$, 60 mole % of Ga$_2$O$_3$ and 1 to 20 mole % of ZnCl$_2$ or SrCl$_2$. FIG. 4 shows the relative luminance of the prepared phosphors with respect to the amount of flux. In FIG. 4, "■" is for the flux of ZnCl$_2$, and "○" is for the flux of SrCl$_2$.

EXAMPLE 5

Figure 5:
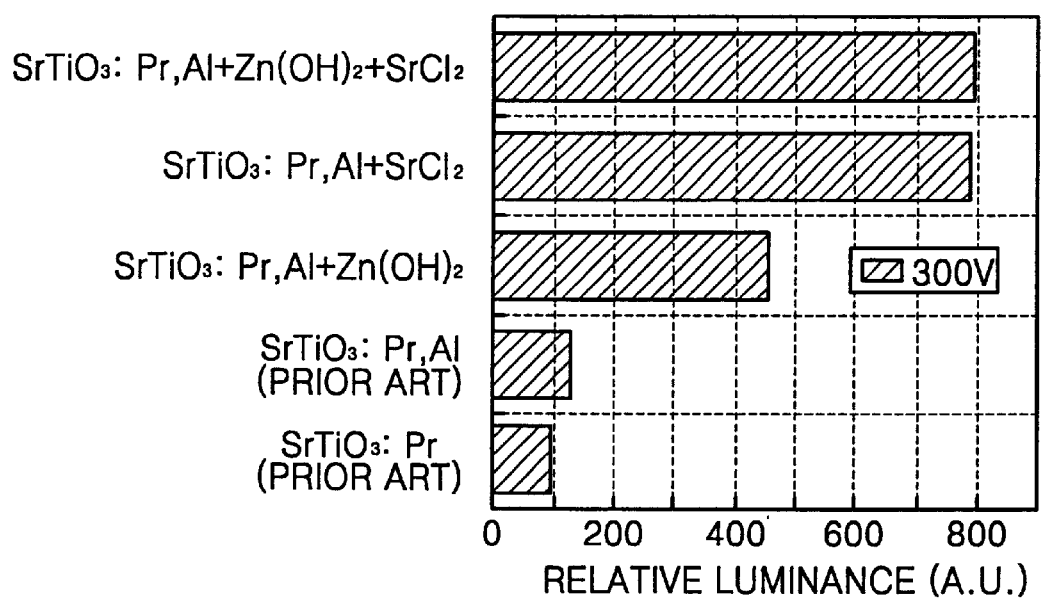
FIG. 5 is a graph showing the relative luminance of the phosphor prepared in Example 5r at 300 V.

A phosphor was prepared based on a SrTiO$_3$ matrix, using 0.3 mole % of Pr$^{3+}$, 17 mole % of Al(OH)$_3$, 10 mole % of Zn(OH)$_2$ and 4 mole % of SrCl$_2$. The relative luminance of the prepared phosphor at 300 V is shown in FIG. 5. As shown in FIG. 5, the phosphors containing SrCl$_2$ exhibit a relatively higher luminance.

As previously described, the SrTiO$_3$: Pr, Al based phosphor having effective emission at a low voltage, which has the composition of (Me$^I$Me$^{II}$Me$^{III}$)TiO$_3$. A$_2$O$_3$, is characterized in that Me$^{II}$ is added in an amount of 0.01 to 15 mole % to a conventional phosphor having the composition of (Me$^I$Me$^{III}$)TiO$_3$. A$_2$O$_3$, where Me$^I$ is a metal selected from the group consisting of Mg, Ca, Sr and Ba; Me$^{II}$ is a metal of Zn or Cd, Me$^{III}$ (0.005 to 5 mole %) is a metal selected from the group consisting of Eu, Tb, cerium (Ce) and thulium (Tm), and A (0.05 to 80 mole %) is a metal selected from the group consisting of aluminum (Al), gallium (Ga), indium (In) and thallium (Tl). The SrTiO$_3$:Pr, Al based phosphor according to the present invention enhances luminance without changing CIE chromaticity (x=0.67, y=0.33), and thus it is applicable to display devices including cathodeluminescence (CL) devices operating with low voltages.

While this invention has been particularly shown and described with reference to preferred embodiments thereof, it will be understood by those skilled in the art that various changes in form and details may be made thereto without departing from the spirit and scope of the invention as defined by the appended claims.

What is claimed is:

1. A phosphor comprising a composition of (Me$^I$Me$^{II}$Me$^{III}$)TiO$_3$. A$_2$O$_3$ obtained by adding Me$^{II}$ to a phosphor having the composition of (Me$^I$Me$^{III}$)TiO$_3$. A$_2$O$_3$, where Me$^I$ is strontium (Sr), Me$^{II}$ is a metal of zinc (Zn) or cadmium (Cd), Me$^{III}$ is a metal selected from the group consisting of praseodymium (Pr), europium (Eu), terbium (Tb), erbium (Er), cerium (Ce) and thulium (Tm), and A is a metal selected from the group consisting of aluminum (Al), gallium (Ga), indium (In) and thallium (Tl).

2. The phosphor of claim 1, wherein Me$^{II}$ is Zn and A is Al.

3. The phosphor of claim 1, wherein Me$^{II}$ is added in an amount of 0.01 to 15 mole % using at least one flux selected from the group consisting of ZnCl$_2$, ZnI$_2$, CdCl$_2$ and CdI$_2$.

4. The phosphor of claim 3, wherein the amount of flux is in the range of 0.5 to 60 mole %.

5. The phosphor of claim 3, wherein Me$^{III}$ is present in an amount of 0.05 to 5 mole %.

6. The phosphor of claim 3, wherein A is present in an amount of 0.5 to 80 mole %.

7. The phosphor of claim 1, wherein the phosphor has a luminance at a voltage of 300 V that is substantially equal to a luminance of the phosphor at a voltage of 500 V.

8. The phosphor of claim 1, wherein the phosphor has a luminance at a voltage of 300 V that is substantially equal to a luminance of the phosphor at a voltage of 1000 V.

* * * * *